United States Patent [19]

Bunyan

[11] 4,410,644

[45] * Oct. 18, 1983

[54] FLOWABLE ANAEROBIC SEALANT COMPOSITION

[75] Inventor: James L. Bunyan, Akron, Ohio

[73] Assignee: Cajon Company, Macedonia, Ohio

[ * ] Notice: The portion of the term of this patent subsequent to May 25, 1999 has been disclaimed.

[21] Appl. No.: 328,203

[22] Filed: Dec. 7, 1981

Related U.S. Application Data

[63] Continuation of Ser. No. 139,634, Apr. 11, 1980, Pat. No. 4,331,580.

[51] Int. Cl.$^3$ .................................................. C08K 5/10
[52] U.S. Cl. ..................................... 523/176; 156/332; 524/313; 524/533; 526/230; 526/320; 526/323.1
[58] Field of Search ................. 523/176; 524/533, 313; 526/323.1, 320, 230; 156/332

[56] References Cited

U.S. PATENT DOCUMENTS

| | | | |
|---|---|---|---|
| 2,895,950 | 7/1959 | Krieble | 526/323.1 |
| 3,002,770 | 10/1961 | Chesnut et al. | |
| 3,041,322 | 6/1962 | Krieble | 526/320 |
| 3,043,820 | 7/1962 | Krieble | 526/320 |
| 3,046,262 | 7/1962 | Krieble | 526/320 |
| 3,218,305 | 11/1965 | Krieble | 526/323.1 |
| 3,435,012 | 3/1969 | Nordlander | 526/270 |
| 3,547,851 | 12/1970 | Frauenglas | |
| 3,814,156 | 6/1974 | Bachmann et al. | |
| 3,826,673 | 7/1974 | Batson et al. | 427/340 |
| 3,851,017 | 11/1974 | Werber | |
| 3,880,956 | 4/1975 | Skoultchi | 526/323.1 |
| 3,931,678 | 1/1976 | O'Sullivan et al. | 433/228 |
| 3,988,299 | 10/1976 | Malofsky | 526/258 |
| 4,069,378 | 1/1978 | De Marco | 526/328 |
| 4,090,997 | 5/1978 | Patel et al. | 526/323.1 |
| 4,092,376 | 5/1978 | Douek et al. | |
| 4,105,715 | 8/1978 | Gleave | 526/298 |
| 4,215,209 | 7/1980 | Ray-Chaudhuri et al. | 526/323.1 |
| 4,331,580 | 5/1982 | Bunyan | 523/176 |

Primary Examiner—Ronald W. Griffin
Attorney, Agent, or Firm—Fay & Sharpe

[57] ABSTRACT

A flowable anaerobic sealant composition adapted to be applied to a threaded surface which is characterized by being stable prior to curing is provided which composition comprises a polymerizable acrylate ester monomer, a hydroperoxide polymerization catalyst for said acrylate ester monomer in an amount sufficient to cause said monomer to polymerize under anaerobic conditions, a quinone polymerization inhibitor in an amount sufficient to prevent said monomer from polymerizing when standing for long periods of time, an organic sulfimide accelerator in an amount sufficient to increase the rate of polymerization of said monomer under anaerobic conditions, and a plasticizer in an amount sufficient to render the solidified sealant composition relatively non-brittle. Optionally, the sealant composition may also contain a thickening agent in an amount sufficient to render said sealant composition flowable at room temperature, a coloring agent in an amount sufficient to render said sealant composition non-transparent, a viscosity controlling agent in an amount sufficient to permit said sealant composition to readily flow into said threads when applied thereto without excessive runoff, and an effective amount of tetrafluoroethylene polymer as an anti-galling agent.

1 Claim, No Drawings

FLOWABLE ANAEROBIC SEALANT COMPOSITION

This application is a continuation of application Ser. No. 139,634, filed Apr. 11, 1980, now U.S. Pat. No. 4,331,580, issues May 25, 1982.

BACKGROUND OF THE INVENTION

The present invention concerns a unique anaerobic sealant composition which is relatively stable prior to curing and a method of producing the same.

Anaerobic sealant systems are those which are stable in the presence of oxygen, but will polymerize in the absence of oxygen. Polymerization is initiated by the presence of a peroxy compound. The cured, cross-linked resins serve as sealants and as adhesives.

Typical resin monomers are terminated with polymerizable acrylate esters such as methacrylate, ethacrylate and chloracrylate esters. Some of the other ingredients typically present are an initiator, preferably an organic hydroperoxide such as cumene hydroperoxide, tertiary butyl hydroperoxide and the like. There is also normally provided a stabilizer against free radical initiation, such as a quinone or hydroquinone, in an amount sufficient to prevent premature polymerization of the adhesive due to decomposition of the peroxy compound. There are also preferably present one or more accelerators which are preferably nitrogen-containing compounds such as tertiary amines, imids, sulfimides and the like which promote the rate of cure. In addition to the foregoing, various other additives are often used to accomplish certain other purposes.

One of the many known commercially acceptable anaerobic compositions is set forth in U.S. Pat. No. 2,895,950 to Krieble, issued July 21, 1959. Other typical disclosures of related or improved anaerobic compositions may be found, for example, in U.S. Pat. Nos. 3,043,820 to Krieble, issued July 10, 1962; 3,046,262 to Krieble, issued July 24, 1962, 3,218,305 to Krieble, issued Nov. 16, 1975; and 3,435,012 to Nordlander, issued Mar. 25, 1969.

While the foregoing patents all disclose anaerobic sealant compositions having certain desirable properties, no teaching can be found in any of them which provides an anaerobic sealant composition which prior to polymerizing is stable for long periods of time, i.e., will not separate into its individual component parts upon standing for an extended period of time.

Accordingly, it is the principal object of the present invention to provide an anaerobic sealant composition which upon standing for an extended period of time will not separate into a plurality of phases.

In addition, another object of the invention is to provide an anaerobic sealant composition which when polymerized forms a solidified sealant mass which is relatively non-brittle.

The above-recited and other objects of the invention will become clear to those skilled in the art from a reading of the following specification and claims.

SUMMARY OF THE INVENTION

In one aspect the present invention concerns a flowable anaerobic sealant composition which is characterized by its ability to remain stable for an extended period of time prior to solidifying and which upon curing is relatively non-brittle which comprises a polymerizable acrylate ester monomer, a hydroperoxide polymerization catalyst for said acrylate ester monomer in an amount sufficient to cause said monomer to polymerize under anaerobic conditions, a quinone polymerization inhibitor in an amount sufficient to prevent said monomer from polymerizing when standing for long periods of time, an organic sulfimide accelerator in an amount sufficient to increase the rate of polymerization of said monomer under anaerobic conditions, and a plasticizer in an amount sufficient to render the solidified composition relatively non-brittle.

In another aspect the present invention concerns a flowable anaerobic sealant composition which is characterized by its ability to remain stable for an extended period of time prior to solidifying which comprises a polymerizable acrylate ester monomer, a hydroperoxide polymerization catalyst for said acrylate ester monomer in an amount sufficient to cause said monomer to polymerize under anaerobic conditions, a quinone polymerization inhibitor in an amount sufficient to prevent said monomer from polymerizing when standing for long periods of time, an organic sulfimide accelerator in an amount sufficient to render said sealant composition flowable at room temperature, a coloring agent in an amount sufficient to render said sealant composition non-transparent, a viscosity controlling agent in an amount sufficient to cause said sealant composition to flow into said threads when applied thereto without excessive runoff, an effective amount of tetrafluoroethylene polymer as an anti-galling agent, and a plasticizer in an amount sufficient to render the solidified composition relatively non-brittle.

DESCRIPTION OF THE PREFERRED EMBODIMENTS OF THE INVENTION

The most desirable monomers for use in the practice of the invention are polymerizable acrylate esters, with the preferred monomer being ethoxylated bisphenol A dimethacrylate.

Typical of the type of monomer material usable in connection with the subject invention is at least one monomer selected from the group consisting of ethoxylated bisphenol A diacrylate, ethoxylated bisphenol A dimethacrylate, and an acrylate ester corresponding to the formula

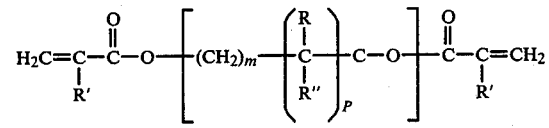

wherein R represents a radical selected from the group consisting of hydrogen, lower alkyl of 1–4 carbon atoms, inclusive, hydroxy alkyl of 1–4 carbon atoms inclusive, and

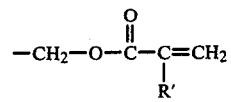

R' is a radical selected from the group consisting of hydrogen, halogen, and lower alkyl of 1–4 carbon atoms; R'' is a radical selected from the group consisting of hydrogen, —OH and

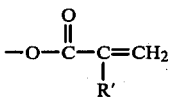

m is an integer equal to at least 1, e.g., from 1 to 8 or higher, for instance, from 1 to about 4 inclusive; n is an integer equal to at least 1, for example, 1 to 20 or more; and p is 0 or 1.

The most preferred of the peroxy initiators for use in combination with the polymerizable acrylate or polyacrylate esters described above are the organic hydroperoxy initiators or catalysts, particularly those organic hydroperoxides having the formula R''' OOH wherein R''' is a hydrocarbon radical containing up to about 18 carbon atoms, preferably an alkyl, aryl, or aralkyl radical containing from one to about 12 carbon atoms. Typical examples of such hydroperoxides are cumene hydroperoxide, methylethylketonehydroperoxide, and hydroperoxides formed by the oxygenation of various hydrocarbons, such as methylbutene, cetane and cyclohexene. However, other peroxy initiators can be used, such as hydrogen peroxide, organic peroxides or organic peresters. Those peroxides and peresters which hydrolyze or decompose to form hydroperoxides frequently are highly useful.

The peroxy initiators which are used commonly comprise less than about 20 percent by weight of the combination of monomer and initiator since above that level they begin to effect adversely the strength of the adhesive bonds which are formed. Preferably the peroxy initiator comprises from about 0.5 to about 10 percent by weight of the combination.

A quinone compound is added to the anaerobic composition to provide it with a reasonable degree of shelf life. In this regard, it is known that the addition of minor amounts of quinones will greatly prolong the shelf life of anaerobic curing compositions during exposure to moderate amounts of air despite the presence of minor amounts of impurities which tend to effect polymerization in the presence of air.

The quinones have been found effective in amounts as little as 10 parts per million and have been used in quantities as great as 1,000 parts per million of the basic sealant formulation. Generally, the actual amount of quinone necessary will be dependent upon the instability of the basic sealant composition, and it is desirable to prepare a test formulation of small quantity for laboratory evaluation.

Of the various quinones, the benzoquinones have proven highly effective and most desirable for general use since they are readily admixed with the sealant compositions and exhibit excellent inhibition. As specific examples of two benzoquinones which have proven particularly effective are 1,4-benzoquinone and 2,5-dihydroxy benzoquinone. Other quinones which may be utilized are 2,5-diphenyl-p-benzoquinone, 1,2-naphthoquinone and 9,10-anthraquinone.

Sulfimides are added to the anaerobic composition to accelerate its polymerization under anaerobic conditions. Among the sulfimides that can be beneficially employed, benzoic sulfimide has proven most useful in that it provides not only optimum acceleration but also good shelf-stability. The sulfimides have been found to be effective in trace amounts, e.g., 0.01 percent, or in amounts up to saturation; however, generally about 0.05 to 10.0 percent by weight is utilized with a preferred range being from 0.1 to 2.0 percent by weight.

A thickening agent is added to the anaerobic composition to control its flow characteristics. This type of agent is used in an amount sufficient to cause the anaerobic composition to have a viscosity such that it readily flows but yet is formable into discrete beads or ribbons when extruded from a tube.

Among the typical materials suitable for this purpose are polyglycols and waxes. In this regard, polyethylene glycol having a molecular weight of about 6000 has been found to function quite satisfactorily. However, polyethylene glycols of different molecular weights and other glycols, such as polypropylene glycol, would also function satisfactorily.

In the preferred embodiment of the invention a coloring agent is added to the anaerobic composition to render it non-transparent so that the sealant can be readily observed as it flows into threads and the like. One material which is ideal for this purpose is pigment grade titanium dioxide particles. This material causes the resultant composition to be essentially white. Obviously, other coloring agents can be utilized if different colors are desired.

If desired, a viscosity controlling agent is added to the anaerobic composition to control its ability to readily flow into voids or valleys, such as into threads and the like, without excessive runoff. To date, fumed silica has been found to be most suitable for this purpose.

When the material of the invention is to be used to bond together threaded stainless steel surfaces, it has been found desirable to add an anti-galling agent to the anaerobic composition. To data, excellent results are obtained when polytetrafluoroethylene type polymers are used for this purpose.

In order to produce a sealant material which is relatively non-brittle a plasticizer is added to the anaerobic composition. The exact amount of plasticizer utilized is a function of the degree of softness desired in the final, solidified sealant and is determined emperically.

The preferred plasticizer is selected from the group consisting of fats and oils (glycerides) and derivatives thereof. Neutral fats and oils are esters of glycerol and long chain fatty acids and are called glycerides. Their general structure is as follows:

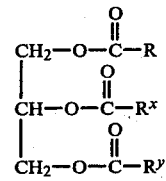

wherein R, $R^x$ and $R^y$ are the same or different fatty acid groups.

In the practice of the invention one material which has been found to perform very satisfactorily is Plastolein 9790 polymeric plasticizer manufactured by Emery Industries, Inc. This material consists of tallow derivatives (animal fats and oils) and is characterized by the following properties:

|  |  | Test Method |
|---|---|---|
| Acid value, mg. KOH/gm. | 1.2 | AOCS Te 1a-64T |
| Hydroxyl value, mg. KOH/gm. | 14.4 | ASTM D1957-61T |

|  |  | Test Method |
| --- | --- | --- |
|  |  | (modified) |
| Color Gardner | 7 | AOCS Td 1a-64T |
| Viscosity, cSt at 100° F. | 16,000 | ASTM D445-65 |
| Viscosity, cSt at 210° F. | 922 | ASTM D445-65 |
| Flash point, °F. | 580 | ASTM D92-66 |
| Fire point, °F. | 635 | ASTM D92-66 |
| Solidification point, °F. | −20 | ASTM D92-57 |
| Refractive index, 25° C. | 1.460 | — |
| Specific gravity, 25/25° C. | 1.08 | ASTM D1298-55 |
| Pounds per gallon | 9.0 | — |

The present invention will now be described with reference to the following example.

EXAMPLE

I. The following materials were placed into a container:
  (a) 60 ml (67 grams) of ethoxylated bisphenol A dimethacrylate,
  (b) 8 mg of para-benzoquinone,
  (c) 0.8 grams of benzoic sulfimide, and
  (d) 2 grams of polyethylene glycol (mol. wt. 6000).

II. This mixture was then heated at a temperature sufficient to dissolve the various ingredients (to a temperature of about 50° C.).

III. To the above material the following ingredients were added:
  (a) 40 ml of animal fat and oil (Plastolein 9790),
  (b) 5 grams of titanium dioxide,
  (c) 53 grams of polytetrafluoroethylene,
  (d) 1 ml of cumene hydroperoxide, and
  (e) 0.5 grams of fumed silica.

IV. The above mixture was blended and allowed to cool to room temperature.

The anaerobic sealant material of the invention, produced as described above, was used to seal the voids between various sizes of stainless steel pipes and fittings therefore with satisfactory results being obtained.

While the sealant composition of the subject invention has been described herein for use in the sealing of voids in stainless steel surfaces, it will be apparent to those skilled in the art that it can be used to seal voids in both non-metallic as well as metallic surfaces, such as conventional steel, brass and the like. All that is required is that it be compatible with the environment in which it is utilized.

While there have been described what are at present considered to be the preferred embodiments of this invention, it will be obvious to those skilled in the art that various changes and modifications may be made therein without departing from the invention, and it is, therefore, intended in the appended claims to cover all such changes and modifications as fall within the true spirit and scope of the invention.

What is claimed is:

1. A method of producing a flowable anaerobic sealant composition which is characterized by its ability to remain stable for an extended period of time prior to solidifying which method comprises mixing together;
  (a) a polymerizable acrylate ester monomer;
  (b) a hydroperoxide polymerization catalyst for said acrylate ester monomer in an amount sufficient to cause said monomer to polymerize under anaerobic conditions;
  (c) a quinone polymerization inhibitor in an amount sufficient to prevent said monomer from polymerizing when standing for long periods of time;
  (d) an organic sulfimide accelerator in an amount sufficient to increase the rate of polymerization of said monomer under anaerobic conditions;
  (e) a thickening agent in an amount sufficient to render said sealant composition flowable at room temperature;
  (f) a coloring agent in an amount sufficient to render said sealant composition non-transparent;
  (g) a viscosity controlling agent in an amount sufficient to cause said sealant composition to flow into said threads when applied thereto without excessive runoff;
  (h) an effective amount of tetrafluorethylene polymer as an anti-galling agent; and
  (i) at least one plasticizer selected from the group consisting of animal fats and oils in an amount sufficient to render the solidified composition relatively non-brittle.

* * * * *